(No Model.) 2 Sheets—Sheet 2.

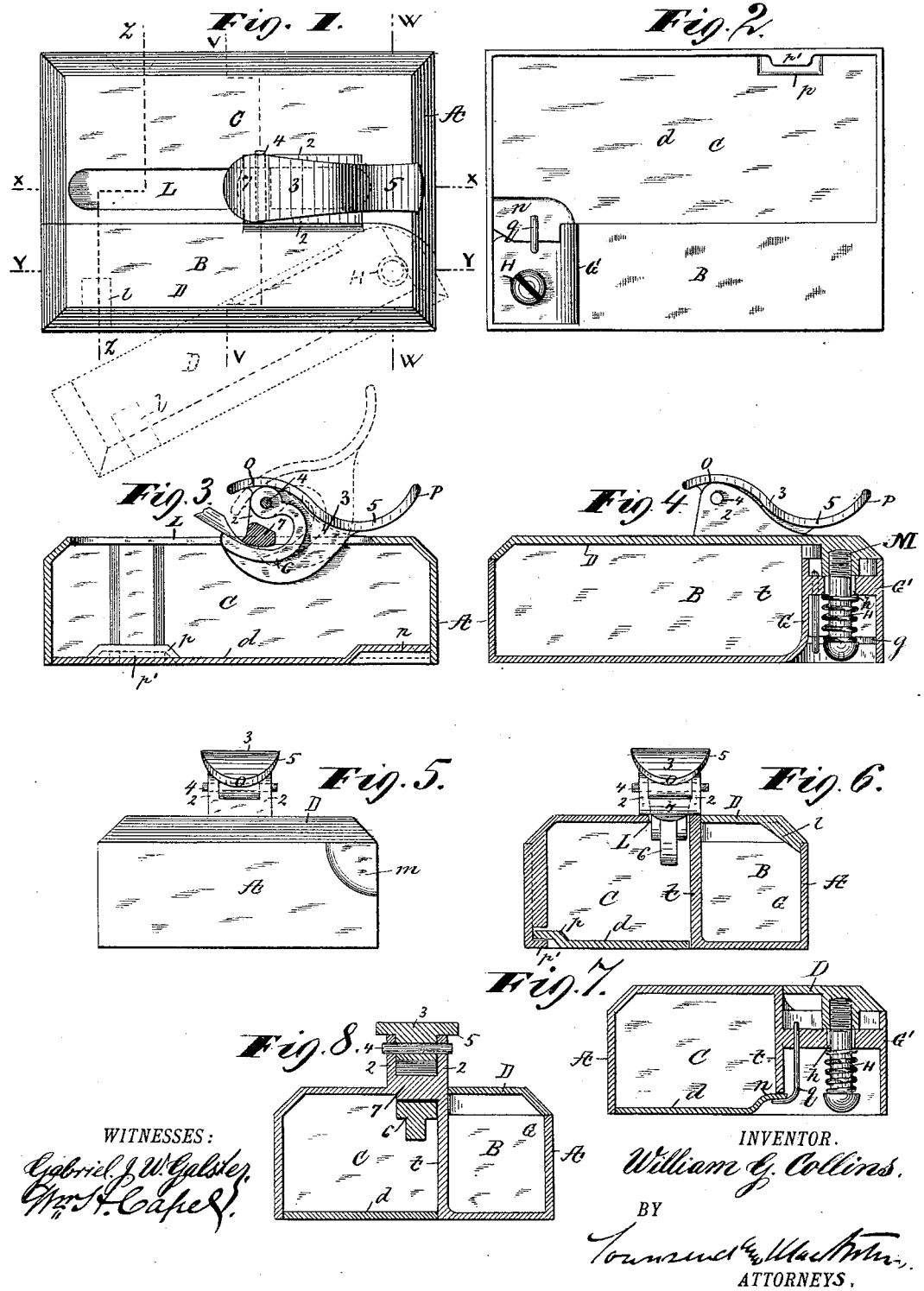

W. G. COLLINS.
PEN EXTRACTOR.

No. 386,455. Patented July 24, 1888.

WITNESSES:

INVENTOR,
William G. Collins.
BY
Townsend
ATTORNEYS.

UNITED STATES PATENT OFFICE.

WILLIAM G. COLLINS, OF ORANGE, NEW JERSEY.

PEN-EXTRACTOR.

SPECIFICATION forming part of Letters Patent No. 386,455, dated July 24, 1888.

Application filed September 7, 1886. Serial No. 212,885. (No model.)

*To all whom it may concern:*

Be it known that I, WILLIAM G. COLLINS, a citizen of the United States, and a resident of Orange, in the State of New Jersey, have invented certain new and useful Improvements in Pen-Extractors, of which the following is a specification.

My invention relates to improved means for extracting pens from their holders; and it consists, generally speaking, in mounting a pen-extractor upon a paper-weight, box, or equivalent structure provided with an interior compartment to receive the discarded pens as they fall from the extractor.

In the present application I have shown and described my invention as particularly applied to a paper-weight; but it is evident that the device may be applied to any hollow box, base, or equivalent structure without departing from the spirit of my invention, which consists, essentially, as before stated, in combining with a pen-extractor a suitable base or support adapted to receive the pens as they fall from the extractor.

Figure 15:
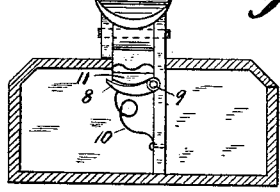
Figure 16:
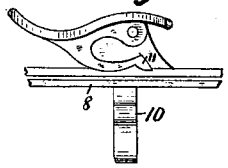

In the accompanying drawings, forming part of this specification, Figure 1 is a plan view of a paper-weight embodying my invention. Fig. 2 is a plan view of the bottom of the same. Fig. 3 is a central vertical longitudinal section on the line X X, Fig. 1. Fig. 4 is a vertical longitudinal section on the line Y Y, Fig. 1. Fig. 5 is an end elevation of a paper-weight embodying my invention. Fig. 6 is a transverse vertical section on the line Z Z, Fig. 1. Fig. 7 is a transverse vertical section on the line W W, Fig. 1. Fig. 8 is a transverse vertical section on the line V V, Fig. 1. Figs. 9, 10, 11, 12, and 13 represent modified forms of clamping-jaws. Figs. 14 and 15 are transverse vertical sections showing the interior shelf. Fig. 16 is a detail view of lid or cover.

A indicates the base or support, which is here represented as a paper-weight of ordinary construction. The paper-weight is in the form of a shell or box, and is divided by the vertical partition $t$ into the two compartments B and C, opening, respectively, on the top and under side of the paper-weight. One of these compartments is designed to hold the unused pens, and the other compartment is designed to serve as a receptacle for the discarded pens. Preferably, the receptacle B, opening on the top of the paper-weight, is utilized as the receptacle for the new pens, and the compartment C, opening on the under side, is used as the receptacle for the discarded pens. By this construction the covering for the latter compartment, which is more rarely used, is located on a part which is not ordinarily in sight, and it may therefore be of rougher and more inexpensive finish.

I find in practice that there is a decided advantage in constructing the box with compartments opening on opposite sides of the same, as in this way I am enabled to cast the body of the paper-weight in one piece without the necessity of coring, as will be readily understood in the art.

The receptacle B is provided with a laterally-swinging lid or cover, D, which is pivoted at one end in a manner which will now be described. A vertical wall, G, separates the compartment B from the space M, that is thus formed between said vertical wall and the sides and central partition of the box. In this space are located the bearings for the swinging lid of the compartment B and the holding device of the removable cover of the compartment C in a manner which will now be described. The space is divided into two unequal parts by the horizontal partition G'. A screw, H, passing up through the aperture $h$ in the horizontal partition, enters a correspondingly-threaded aperture in the under side of the lid D, as shown. A spiral spring, $k$, encircling the screw, is interposed between the horizontal partition and the head of the screw H. The aperture $h$ in the horizontal partition is slightly larger than the diameter of the screw to permit of the free play of the screw or pivot. A lug, $l$, on the side of the opposite end of the lid rides over and engages with the side of the paper-weight to hold the same in position. A depression, $m$, at the end of the box enables the operator to readily lift the lug out of engagement with the side of the paper-weight and swing the lid laterally, so as to expose the compartment.

The compartment C is closed by a removable plate, $d$, a depression, $p$, at one end of which passes under the lug $p'$ on the side of the paper-weight. The other end of the plate is countersunk on the edge $n$, corresponding to the space before described, beneath the horizontal partition g, and a swinging clamp, q, located in that space, rides over the countersunk portion n and holds it in place without breaking the continuity of the lower face of the paper-weight.

The pen-extracting devices are as follows: On the sides of the slot or aperture l, formed in the upper side of the compartment C, are located parallel upright bearing-plates 2 2, to which is hinged the cam-lever 3 by the pivot 4 in a manner which will be readily understood.

The cam-lever may be described as consisting of two parts, the upper part or the hand-hold, 5, and a lower depending clamping-jaw, 6. The hand-hold 5 is extended laterally over the bearing-plates 2 2, as shown in Figs. 1, 5, 6, and 8, and indicated at O sufficiently far to afford a convenient handle by which to lift the paper-weight. The rear end of the hand-hold is upturned at P, as shown, so that resistance can be offered by the hand of the operator to the forward impulse given to the paper-weight by the operation of extracting the pen. The movable clamping-jaw 6 engages with a fixed jaw, 7, which in Fig. 1 is shown as consisting of a bridge extending from side to side of the top across the slot.

The operation of the device is as follows: The outer end of the handle being raised, as shown by dotted lines in Fig. 3, the pen is inserted between the fixed and movable jaws. A downward pressure on the end of the lever serves to secure the pen tightly between the jaws. It is then easily removed from the pen-holder and falls into the receptacle which is provided for its reception, as described. It is evident that these clamping-jaws may be arranged in a variety of ways without departing from the spirit of my invention in this respect, provided that in all cases the jaws are so arranged with reference to the slot or aperture opening into the interior compartment that the pens are automatically delivered therein upon being removed from the holder. Thus in Figs. 10 and 11 I have shown a horizontal moving clamping-jaw, 6, provided with the extension 15, operating in conjunction with a fixed jaw, 7, which in this case consists of an upward extension of the box from the side of the slot. The movable jaw 6 in this form may be cast with a hood, (indicated at O 11,) which can be utilized as a handle or finger knob.

Figure 9:
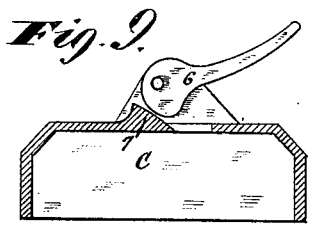
Figure 10:
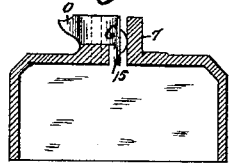
Figure 11:
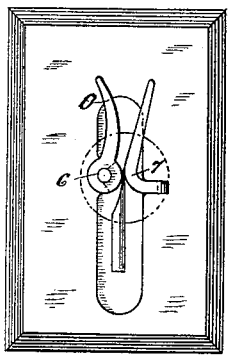

In Fig. 9 the movable clamping-jaw 6 is arranged transversely across the slot or opening in the compartment C for the reception of the discarded pens, and engages with the fixed jaw 7, which consists of an upward extension of the side of the box, as shown. The movable jaw oscillates in a vertical plane, as in Fig. 1. The pen is caught between these two jaws upon the downward movement of the outer end of the lever and slides forward between the jaws into the box when the lever is raised.

Figure 13:
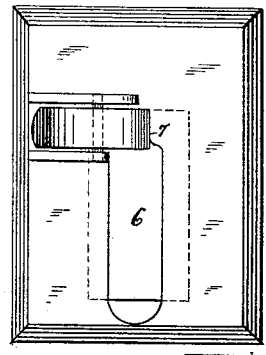
Figure 12:
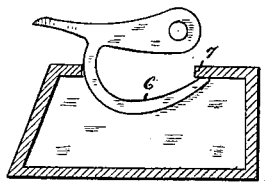
Figure 14:
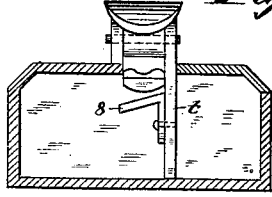

In the form shown in Figs. 12 and 13 the movable clamping-jaw 6 is arranged transversely across the slot and engages with a fixed jaw, 7, which in this instance is the under side of the box itself. In this form the movable jaw extends the entire length of the slot, into which it dips, and closes the same when the device is not in use. Preferably, however, I secure this latter result of partially closing the opening to the box and keeping the discarded pens from view by means of the devices shown in Figs. 14, 15, and 16.

In Fig. 14 is shown a shelf, 8, permanently attached to the central partition, t. This shelf is inclined away from the partition toward the interior of the box, so that the pens may slide off out of sight. The shelf forms substantially a cover for the purpose of keeping the old pens out of view. In Fig. 15 the shelf 8 is represented as hinged at the point 9, and is supported in its upward position by the spring 10. By this arrangement I am enabled to bring the shelf nearer to the slot or opening, and it therefore accomplishes in a more complete manner the purpose in view.

A cam, 11, on the lower side of the movable clamping-jaw depresses the shelf, as more particularly shown in Fig. 16, and lets the pen slide off into the interior of the compartment.

In this application I have shown and described the movable clamping-jaw as consisting of a cam-lever or its substantial equivalent; but it is evident that this movable jaw might be in the form of a screw engaging in the manner before described with a fixed jaw or abutment, or a variety of other constructions might be adopted, without departing from the spirit of my invention in this respect. I have also shown my invention as applied to a paper-weight with one moving jaw and one fixed jaw, as that is the most convenient and preferable form of the invention; but I do not confine myself to that construction, as it would clearly be an equivalent arrangement to make both of the jaws movable.

I am aware of the patent granted to J. A. Hard, No. 175,082, and I make no claim to anything shown or described therein.

What I claim as my invention is—

1. As a new article of manufacture, a paper-weight or equivalent structure provided with a pen-extracting device and an interior compartment beneath the same for the reception of discarded pens.

2. As a new article of manufacture, a paper-weight or equivalent structure provided with a pen-extracting device, an interior compartment for the reception of the discarded pens, and an interior compartment for holding the unused pens, as and for the purpose described.

3. As a new article of manufacture, a paper-weight or equivalent structure provided with a pen-extracting device and an interior compartment adapted to receive the discarded pens as they fall from the pen-extracting device, as and for the purpose described.

4. In a paper-weight or equivalent structure, the combination of a pen-extracting device, and an interior compartment located beneath the same and provided with an opening adapted to receive the discarded pens as they fall from the pen-extracting device, as and for the purpose described.

5. In a paper-weight or equivalent structure, the combination of a pen-extracting device, and an interior compartment located beneath the same and provided with an elongated opening in proximity to the pen-extracting device, whereby the pen and pen-holder may be readily presented to such device and the discarded pens fall into the compartment, as and for the purpose described.

6. A paper-weight provided with clamping-jaws to extract pens from their holders, and an interior compartment beneath the same, adapted to receive the pens as they fall from the clamping-jaws, as and for the purpose described.

7. A paper-weight or equivalent structure provided with clamping-jaws, an interior compartment beneath the same to receive the pens as they fall from the clamping-jaws, and an interior compartment to hold the unused pens, as and for the purpose described.

8. A paper-weight provided with clamping-jaws for extracting pens from their holders, one of the jaws being extended laterally over the bearings to furnish a hand-hold or finger-knob, as and for the purpose described.

9. As a new article of manufacture, a paper-weight provided with clamping-jaws mounted thereon, the moving jaw being provided with a hand-hold or finger-lever with an upturned end, as and for the purpose described.

10. In a paper-weight or equivalent structure, the combination of a pen-extracting device, an interior compartment beneath the same, provided with an opening adapted to receive pens as they fall from the extractor, and a shelf located in said compartment and beneath the opening of the same, as and for the purpose described.

11. In a paper-weight or equivalent structure, the combination of a pen-extracting device, an interior compartment beneath the same, provided with an opening adapted to receive pens as they fall from the extractor, and a spring-supported shelf located within or below such opening and adapted to be pressed down by a cam projection from the extractor, as and for the purpose described.

12. A paper-weight or equivalent structure provided with a pen-extracting device, an interior compartment provided with an opening contiguous to such pen-extractor, and a second compartment provided with an opening on the opposite face of the structure, as and for the purpose described.

13. A pen-extractor mounted upon a paper-weight or equivalent structure, consisting of a fixed and a movable jaw, the latter being arranged to move out of the path of the falling pen, whereby the discarded pens may fall into the compartment below, as and for the purpose described.

14. The combination, with a pen-extractor, of a box provided with three compartments, B, C, and M, the compartments B and C having swinging or movable lids, the bearings or hold devices of which are located in the compartment C, as and for the purpose described.

15. The combination, with a pen-extractor, of a box provided with three compartments, one of said compartments having a swinging lid, the bearing of which is located in an adjacent compartment, as and for the purpose described.

16. As a new article of manufacture, a paper-weight or equivalent structure provided with an interior compartment, and a pen-extracting device consisting of a fixed and movable jaw, substantially as specified.

Signed at New York, in the county of New York and State of New York, this 2d day of September, A. D. 1886.

WILLIAM G. COLLINS.

Witnesses:
 WM. H. CAPEL,
 GABRIEL J. W. GALSTER.